Oct. 21, 1941.  H. W. MORGAN ET AL  2,259,577
MACHINE FOR MAKING INNER-LINER LAMINATED TUBES
Filed June 15, 1939    10 Sheets-Sheet 1
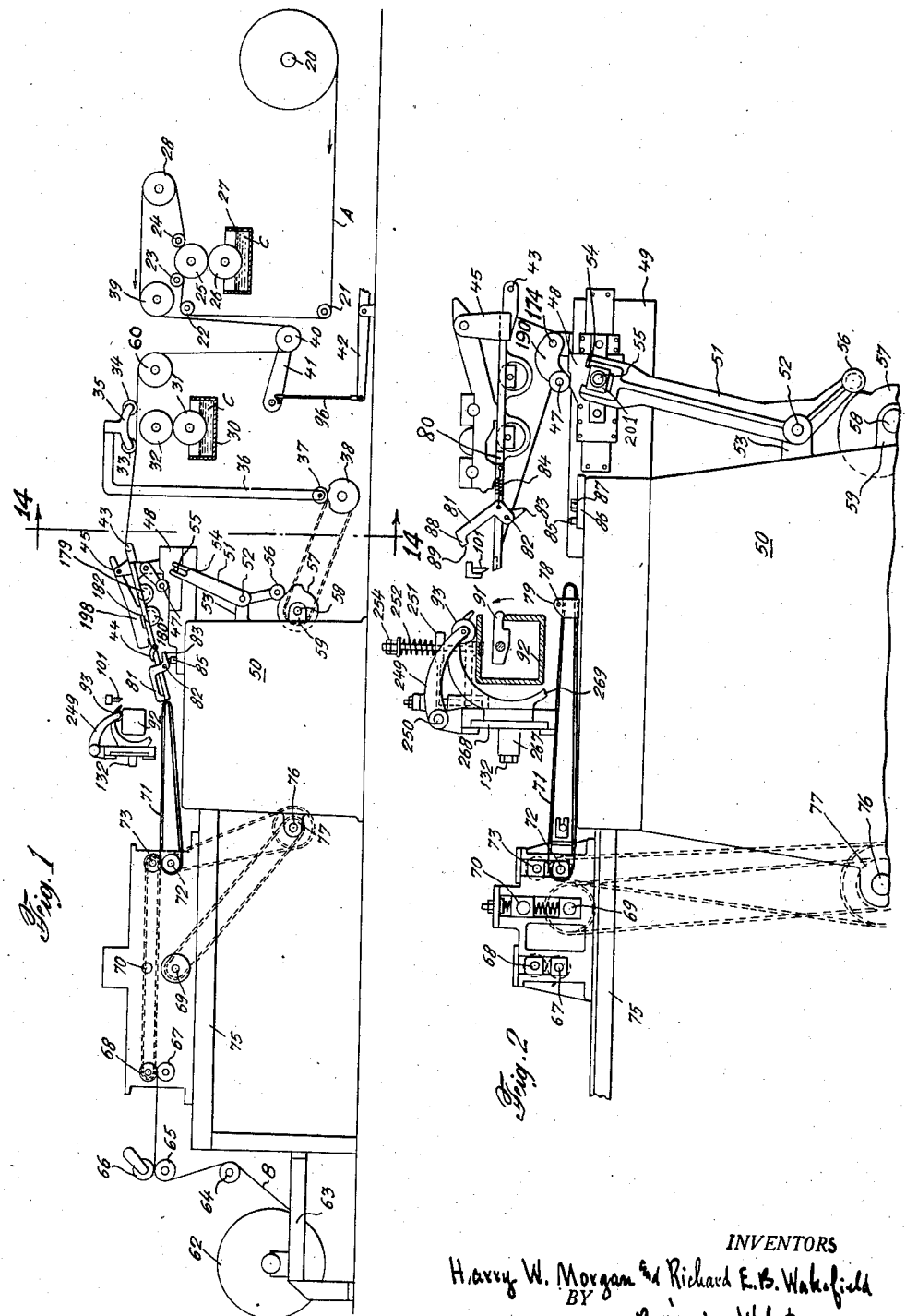
INVENTORS
Harry W. Morgan and Richard E. B. Wakefield
BY
Benjamin Webster
ATTORNEY

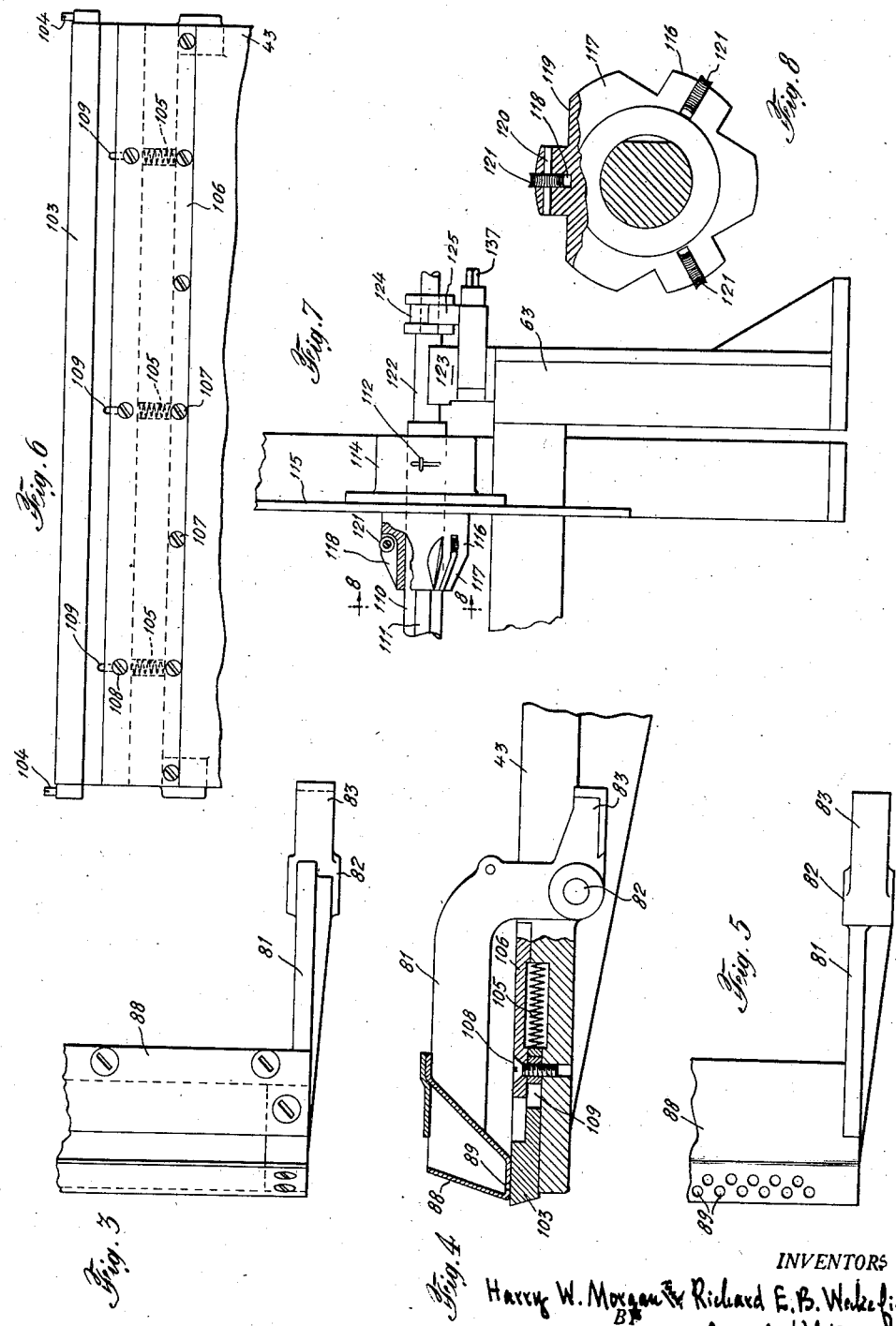

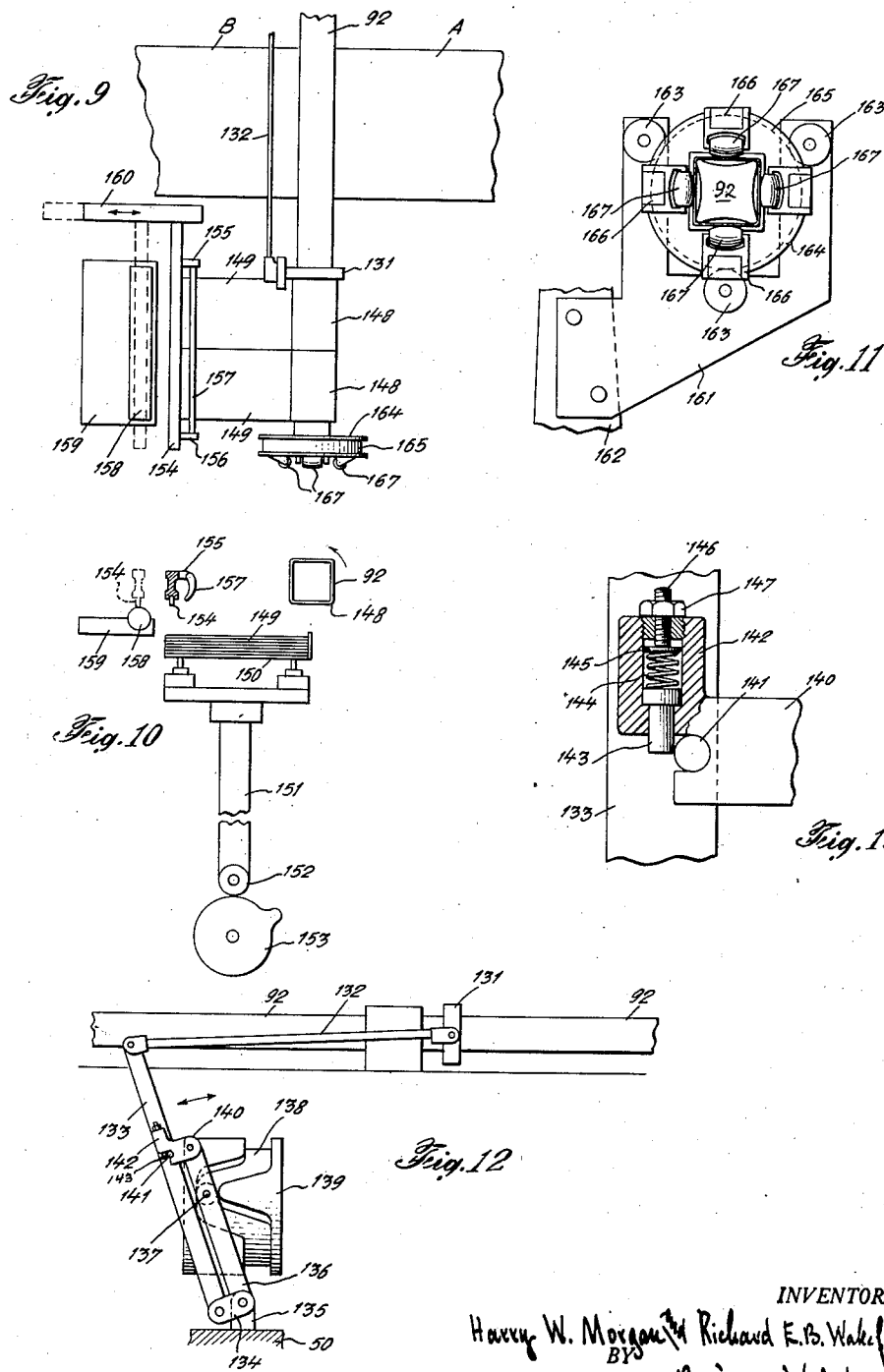

Oct. 21, 1941. H. W. MORGAN ET AL 2,259,577
MACHINE FOR MAKING INNER-LINER LAMINATED TUBES
Filed June 15, 1939 10 Sheets-Sheet 4

INVENTORS
Harry W. Morgan & Richard E. B. Wakefield
BY
Benjamin Webster
ATTORNEY.

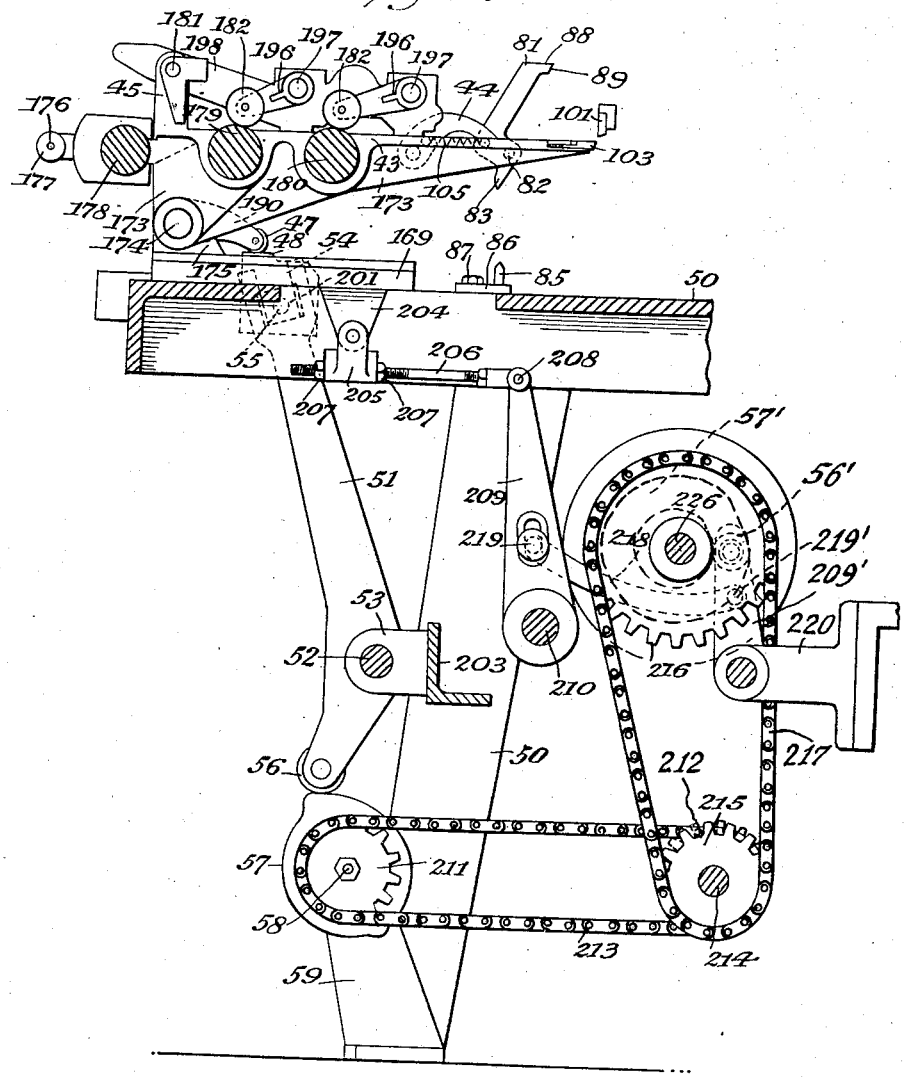

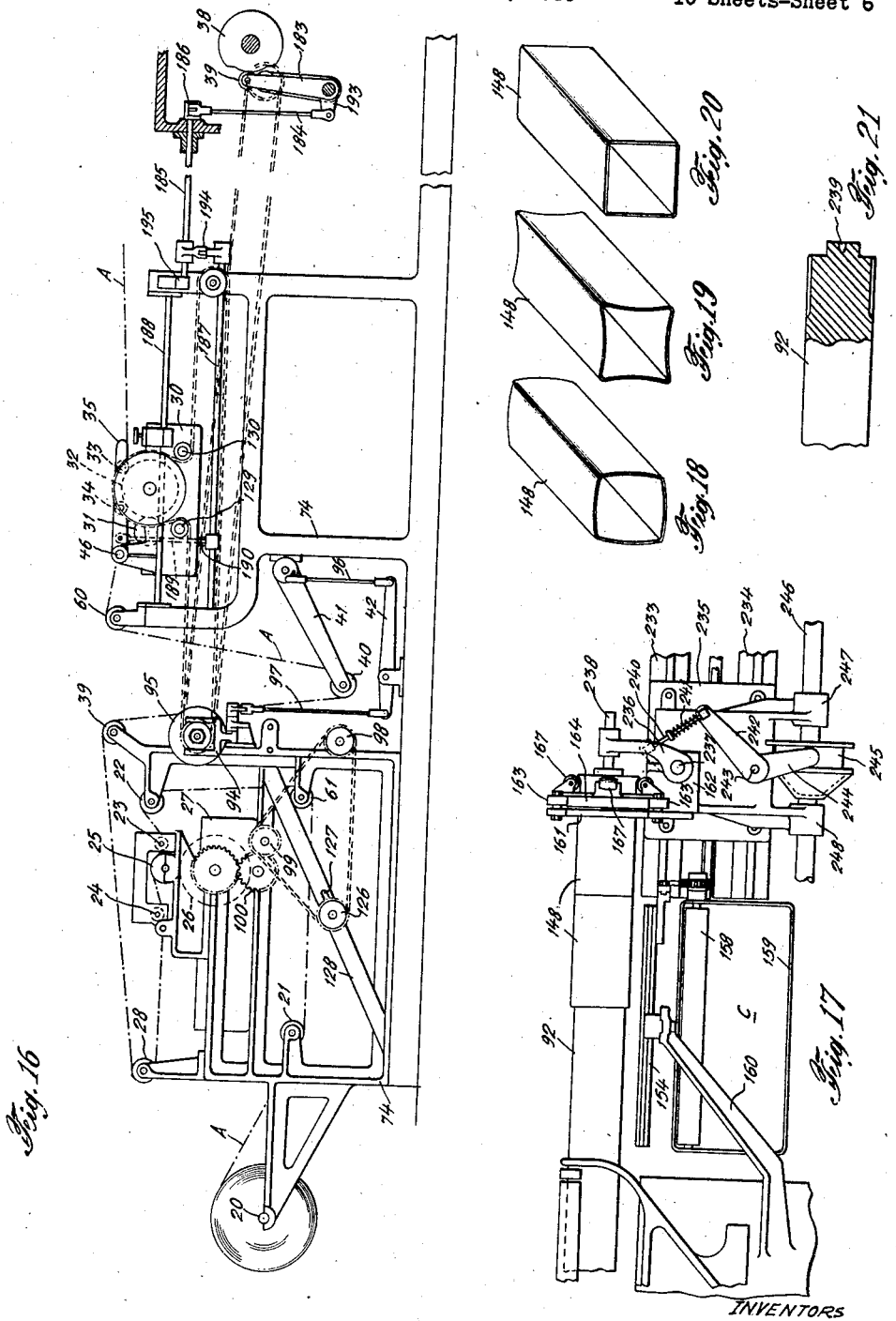

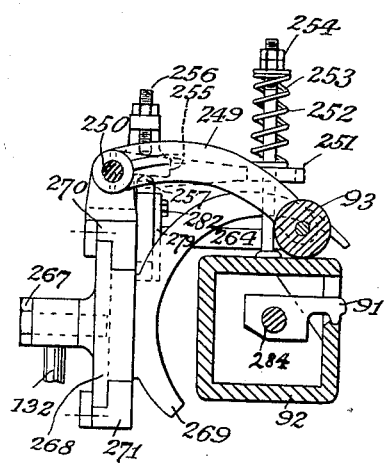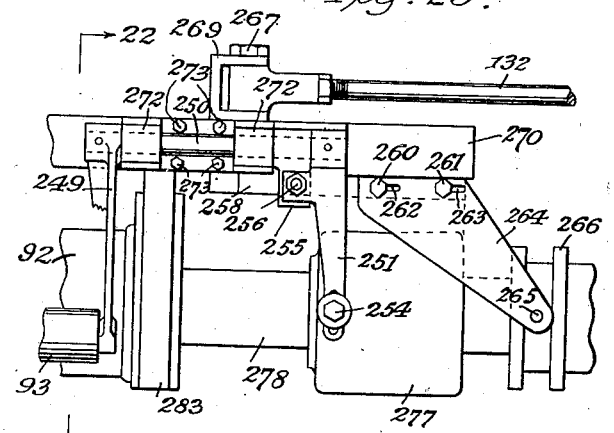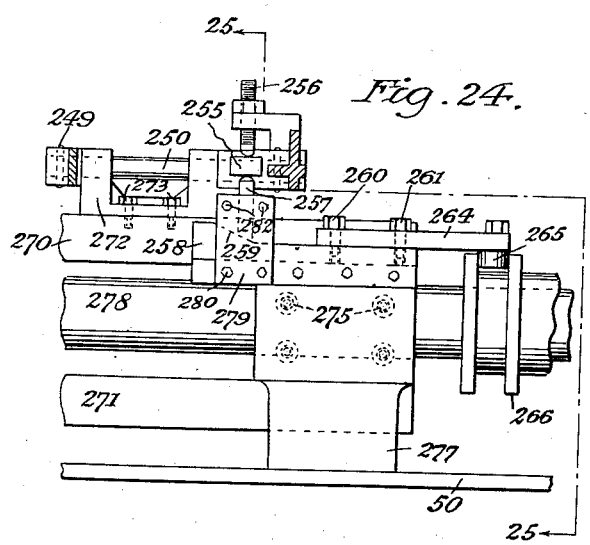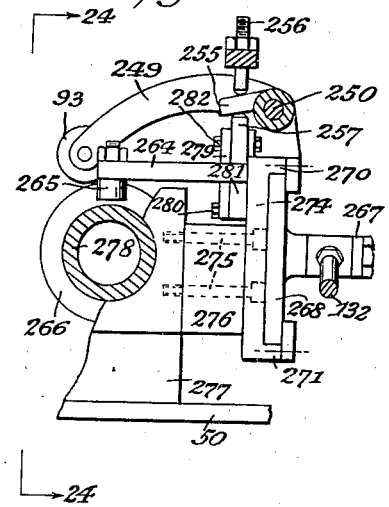

Oct. 21, 1941.   H. W. MORGAN ET AL   2,259,577
MACHINE FOR MAKING INNER-LINER LAMINATED TUBES
Filed June 15, 1939   10 Sheets-Sheet 8
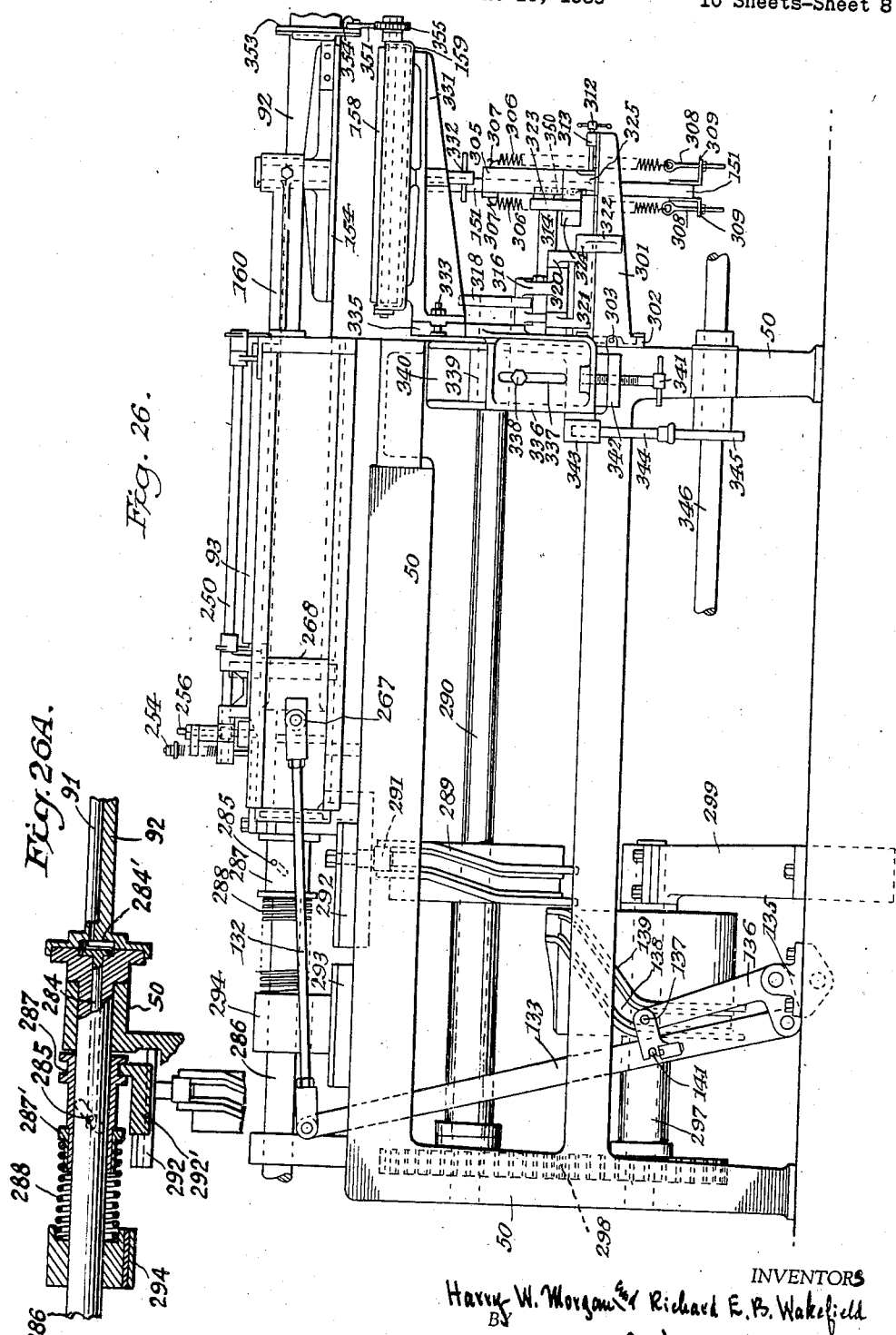
INVENTORS
Harry W. Morgan & Richard E. B. Wakefield
BY Benjamin Webster
ATTORNEY.

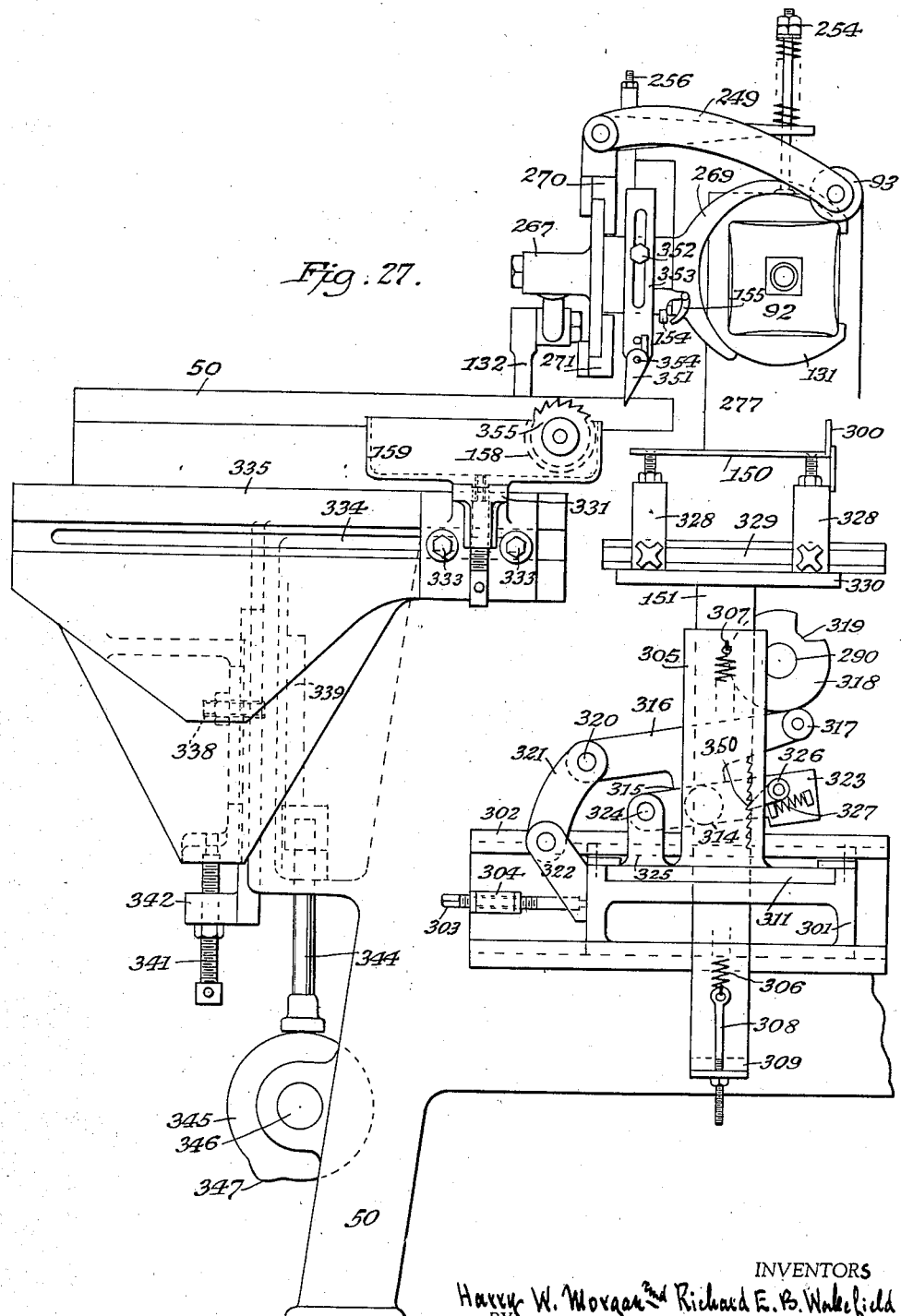

Oct. 21, 1941.   H. W. MORGAN ET AL   2,259,577
MACHINE FOR MAKING INNER-LINER LAMINATED TUBES
Filed June 15, 1939    10 Sheets-Sheet 10

INVENTORS
Harry W. Morgan & Richard E. V. Wakefield
BY
Benjamin Webster
ATTORNEY.

Patented Oct. 21, 1941

2,259,577

UNITED STATES PATENT OFFICE 2,259,577

MACHINE FOR MAKING INNER-LINER LAMINATED TUBES

Harry W. Morgan, Phillipsburg, N. J., and Richard E. B. Wakefield, Easton, Pa., assignors to The Canister Company, Phillipsburg, N. J., a corporation of New Jersey Application June 15, 1939, Serial No. 279,320

22 Claims. (Cl. 93—81)

The present invention relates to a machine for manufacturing laminated container bodies, more particularly to the manufacture of laminated tubes formed of fibrous material, such as chip stock, and having metallic end closures, such tubes being particularly adapted to hold oil, grease or similar substances, or hygroscopic or deliquescent materials.

A chief object of the invention is to provide an automatic machine for forming a laminated tubular container body having metallic end closures in which there is an inner-liner that has the property of being practically non-permeable by water or oil, such as glassine, parchment, Cellophane, cellulose-acetate material, thermoplastic material, grease-proof, or the like, secured by a suitable adhesive, non-permeable by oil or water, to the inner wall of the tubular structure, in such a way as to absolutely seal the cut edge as well as the wall of the inside layer of chip away from the contents of the container.

In the manufacture of paper containers, it has been for many years well-known in the art, to provide an inner-liner such as described above over the inner wall of a paper tube and over the cut edge of the inside of the tube by forming the inner-liner over the cut edge and between the first lamination and the next inside lamination. Such structure was disclosed in U. S. patent to Moore, No. 1,091,526, dated March 31, 1914. The present invention does not make any claim to the improved article, the teaching of which was fully disclosed in the Moore patent.

The present invention contemplates primarily the continual feeding of a sheet of chip from a parent roll and the concurrent continual feeding of a sheet of innerliner material as set forth above from another parent roll to the gripper jaw of a rotatable mandrel.

Another object of the invention is to provide an improved mechanism for applying adhesive to one entire surface of the sheet of chip as it is fed from the parent roll to the gripper jaw of the mandrel and simultaneously and intermittently applying a coating of adhesive to the opposite side of the sheet of chip as it is fed from the parent roll to the mandrel for distances which are slightly greater than that of the circumference of the inside of the tube to be formed.

Another object of the invention is an improved mechanism for automatically feeding the edge of the inner-liner sheet to a position over the edge of the chip sheet and pressing the inner-liner edge tightly upon the chip sheet edge so that the two sheets adhere together with the body portion of each sheet extending away in a different direction. The improved automatic mechanism may comprise a table movable toward and away from the mandrel on which the leading edge of the chip sheet is fed, and means for imparting and compounding with the horizontal motion an arcuate vertical motion of the table to move the front edge of the table to the fixed delivery station of the leading edge of the inner-liner material and thence to the mandrel.

Another object of the invention is to fold back the main body of the inner-liner sheet in a direction opposite to the feeding direction of the chip paper and to move the chip paper edge with the inner-liner sheet folded thereover into the jaw of the mandrel where it is gripped, in a manner well-known in the art, prior to the rotation of the mandrel and the winding of the chip sheet into a tube with the inner-liner sheet covering the inside wall of the container body.

Another object of the invention is to cover the top of the edge of the inner-liner material, after it is placed on the leading edge of the chip sheet, with a layer of adhesive so that it will be securely fastened, when rolled on the mandrel, to the inside of the second lamination of the container tube.

Other objects of the invention are to provide automatic machinery for cutting the inner-liner sheet to the required length and also cutting the chip sheet to the required length for the tube to be manufactured.

Another object of the invention is the provision of an improved stripper for moving the formed tube along the mandrel to the labeling station and after labeling, to eject the labeled container from the end of the mandrel. The improved mechanism comprises a spring-controlled arm which automatically breaks away after a predetermined pressure so as to prevent jamming and mutilation of the tubes on the mandrel.

Another object of the invention is to provide automatic mechanism for applying the labels, one at a time from a stack of labels lying on a table near the mandrel. The labeling mechanism also includes an improved automatic device for picking up the labels, one at a time, off the stack of the table, and also an improved mechanism for applying adhesive to the outer inside edge of the label so that it will stick down securely on the outside of the container, especially where the end of the label overlaps the other surface of the label to prevent the separation of the label from the container body along the outer edge.

Another object is to provide an improved automatic mechanism rotatable with the mandrel for truing the ends of each tube, especially when they are of non-circular form so that the metal closure ends can be readily placed in position over the ends of the tubes.

Another object of the invention is to provide an improved mounting for rolls which turn over the surface of the mandrel to eliminate the bumping of these rolls especially when the surface of the mandrel is non-circular in form and to cause the rolls to press tightly on the laminations during the process of forming the tubes to assure their complete adhesion throughout the laminations.

Mechanism is also provided for automatically lifting these pressure rolls out of operative position as the stripper is moved along the mandrel to displace the finished tubes. The improved mechanism of truing the tubes is so synchronized with the lamination of the tube and with the application of the moist adhesive, that the operation is performed just prior to the final set or drying of the adhesive between the laminations of the tube.

Another object of the invention is to provide transverse slitters or knives for partially, but not completely cutting the sheet of inner-liner material so that it feeds continuously up to the point of juncture with the chip and is easily finally severed or broken away after the combined edges of the inner-liner material and chip board are fed toward the gripper jaw of the mandrel.

Another object of the invention is to provide an improved mounting for the parent rolls of paper which permits the easy insertion of the roll of paper on a suitable stand and prevents the sliding or rotation of the roll with reference to the support, and comprises a plurality of rotatably mounted circular blades which are pivoted on the ends of the roll supports so as to press sharply into the core to join non-rotatably the parent roll and the rotatable bushings.

In one form of our invention, the sheet of chip is fed from one end of the machine and the sheet of inner-liner material is fed from the opposite end and they are secured together by having the leading edge of one sheet fed directly over the leading edge of the other sheet. In other modifications of the invention, the leading edges of the chip and the inner-liner material may be fed to the gripper jaw of the mandrel in planes at angles to each other and a tucker bar may be mounted adjacent the gripper jaw and automatically operated to tuck the combined edge of the two sheets into the gripper jaw which grips the combined joint before the mandrel starts to rotate.

Other objects of the invention are simple automatic mechanical devices for applying adhesive to opposite sides of the sheet and simple mechanisms for regulating the feed of the sheets, maintaining the sheets in a perfectly flat condition throughout their feed, simple mechanism for truly measuring the sheets to desired sizes, for forming different kinds of container bodies and a simple cutting device, and simple means for synchronously operating the different devices of the invention so that a completely automatic machine, free from any liability to breakdown, or stoppage, is provided.

In a preferred form of the invention, a parent roll of chip board web is placed at one end of the machine. The web is threaded over rolls to two rolls mounted in vertical tandem over a glue pot. The rolls over the glue pot are intermittently driven by a clutch to apply glue to the surface of the web which is to form the outer wall of the tube. The web A is wide enough to form a plurality of container tubes and, after glueing, is passed under slitter rolls which slit the web longitudinally for forming a plurality of tubes of any predetermined size. The web is passed over a dance roll which is connected to a lever so positioned that it operates the drive clutch for the first-mentioned glue pot.

The web is next passed over rolls mounted over a second glue pot. These rolls apply glue to the opposite surface of the web. The web normally is out of contact with these rolls, but a pair of rolls are disposed on the other side of the web in juxtaposition to the glue-pot rolls and are intermittently moved to press the web A down into contact with the glue roll at predetermined intervals under the control of a rotatable cam. The web is next led over a feed plate or table on which it is held against back-slipping by a gravity lever. A device for slitting the web A is mounted on the table and consists of a driven matrix roll over which the web A travels. Resting upon the web A on the roll are slitter knives. This feed table reciprocates in a horizontal plane under the control of a cam and also moves in an arcuate vertical plane under the control of a sliding cam, a lever and rotating cam in compound relationship to the horizontal motion.

On the opposite end of the machine, on another parent roll, is mounted a web of impervious material such as glassine which is to form the inner-liner of the tube. This web is threaded over rolls, and slitter knives slit the web into predetermined widths for forming container bodies of desired lengths. The web is threaded long between feed and metering rolls and between a roll and a transverse knife or cutter which gives the web a transverse cut, but leaves enough uncut portions to maintain a continuous web up to the end of a vacuum belt. The feed roll for the vacuum belt has an oppositely disposed roll which contacts the belt and maintains tension on the web under the transverse cutter. When the web is at the end of the vacuum belt, the table carrying the chip board web swings down so that the ends of the two webs are extending toward each other in oppostie directions. The inner-liner web extends a short distance over the end of the chip board web and on top of it, and when the ends of the webs are in this position, a glue finger mounted on the table, swings down to clamp the ends of the two webs together. This glue finger also carries a reservoir of adhesive material and applies the adhesive to the top edge of the inner-liner web when the finger clamps the two ends together. After the ends are clamped together and adhesive is applied to the top of the inner-liner web, the table moves upwardly and the finger moves away.

As the table reaches this uppermost position, which is the horizontal position, the combined webs are entered into the gripper of a mandrel, the gripper is closed by any well-known mechanism, the mandrel is rotated as is well-known in the art, and at the same time a pressure roll is moved into position by a cam to engage the outer surface of the web as it is rolled into a container tube. When the web has been wound to form a container tube of the desired number of laminations, the mandrel is stopped and meantime the table has moved back and upward under a transverse stationary knife or cutter, causing the cutter or knife to sever the web from the remainder of the strip. After the web is severed, a stripper is allowed to move along the mandrel, simultaneously lifting the pressure roll out of position, and positioning the formed tubes on the mandrel for applying labels to the outside of the several container bodies.

The mechanism is so arranged that after the two webs are secured together by the glue finger and after the table is moved up toward the gripper the inner-liner web is torn off along the partially cut line thereby eliminating all strain on the inner-liner web as it is threaded from the parent roll.

The labels are mounted on a small table under the mandrel and a cam under the table lifts the table so that the leading edge of a top label is pressed against the outside of the tube which has been formed. At the same time the opposite or trailing edge of the top label is brought in contact with a glue bar which places glue on the trailing edge of the label so that when the label is wound on the container, the trailing edge of the label sticks down tightly. In connection with the glue bar is mounted a hinged stripper which strips the label from the glue bar when the table moves down and the glue bar is moved away toward a glue roll which continually replenishes the bar with glue.

When the labels have been secured on the outside of the laminated tubes, the tubes, being pushed by the stripper on the mandrel, enter a squaring device. This device comprises four rolls disposed to contact the four sides of the tube and are so mounted in a collar which is rotatable around the axis of the mandrel, that the rolls turn with the mandrel. The rolls tend to distort the side walls of the tube inwardly so that by the time the glue has set, the sides of the tube have returned to normal square positions which assures that the tube end wall is in true form for inserting the tin ends for seaming.

A mechanism is provided for releasing the arm which actuates the mandrel stripper in case of a jam to prevent breakage. The arm is actuated by a convolute cam and is pivoted with a second parallel lever at the same end. The second parallel lever carries the roll which engages the cam and the lever itself is connected at the other end of the second lever by a spring-controlled latch, the spring having such a tension that in case of a jam, the stripper-actuating lever breaks away from the second lever and fails to operate the stripper.

The slitter roll and slitter knives are mounted on the table and slots are provided on both sides of the table so that the trimmed edges of the web from which the container body is formed may be deflected down to the floor under the machine as they are trimmed off.

Reference is made to the drawings in which

Fig. 1 is a schematic side elevation showing the structure for forming an inner-liner tube.

Fig. 2 is an enlarged side elevation showing the central structure illustrated in Fig. 1.

Fig. 3 is a top view showing one end of the glue pot and one arm for mounting it on the side of the table at the end near the mandrel.

Fig. 4 is a side view showing the glue pot in the operative position shown in Fig. 1 and sectioned in part to show the movable edge of the table.

Fig. 5 is a bottom view of the opposite side of the glue pot shown in Fig. 3.

Fig. 6 is a plan view of the end of the table showing the arrangement of the movable edge.

Fig. 7 is an end view showing the improved mounting for one of the parent rolls partly in section.

Fig. 8 is a view taken on the line 8—8 of Fig. 7 partly in section.

Fig. 9 is a top plan view facing the delivery end of the mandrel.

Fig. 10 is a side elevation facing the delivery end of the mandrel and illustrating the labeling mechanism.

Fig. 11 is an end view of the attachment for truing tubes as they are delivered at the end of the mandrel.

Fig. 12 is a rear elevation showing the actuating mechanism for the mandrel stripper.

Fig. 13 is an enlarged detail of the safety pin mechanism, partly sectioned, taken out of Fig. 12.

Fig. 15 is a sectional elevation taken on the line 15—15 of Fig. 14.

Fig. 16 is a side elevation opposite to that of Fig. 1 and of the right end of Fig. 1 with the mandrel and feed table omitted.

Fig. 17 is a plan view showing the labeling station and the truing rolls at the end of the mandrel.

Fig. 18 is a perspective showing a tube before it enters the truing rolls.

Fig. 19 is a perspective showing a tube while it is in the truing rolls.

Fig. 20 is a perspective showing a tube after it has passed thru the truing rolls.

Fig. 21 is an end elevation, partly in section, showing the end of the mandrel.

Fig. 22 is a section on the line 22—22 of Fig. 23 viewed from the left end and showing the mechanism for lifting the rolls that press on the mandrel.

Fig. 23 is a plan view of the mechanism shown in Fig. 22.

Fig. 24 is an elevation on the line 24—24 of Fig. 25 showing the same mechanism.

Fig. 25 is a view taken on the line 25—25 of Fig. 24 looking from the right end.

Fig. 26 is a front elevation showing the labeling station at the right.

Fig. 26a is a view partly in section showing the actuating mechanism for the gripper on the mandrel.

Fig. 27 is a right end view of Fig. 26 but enlarged and with certain parts omitted.

Figure 14:
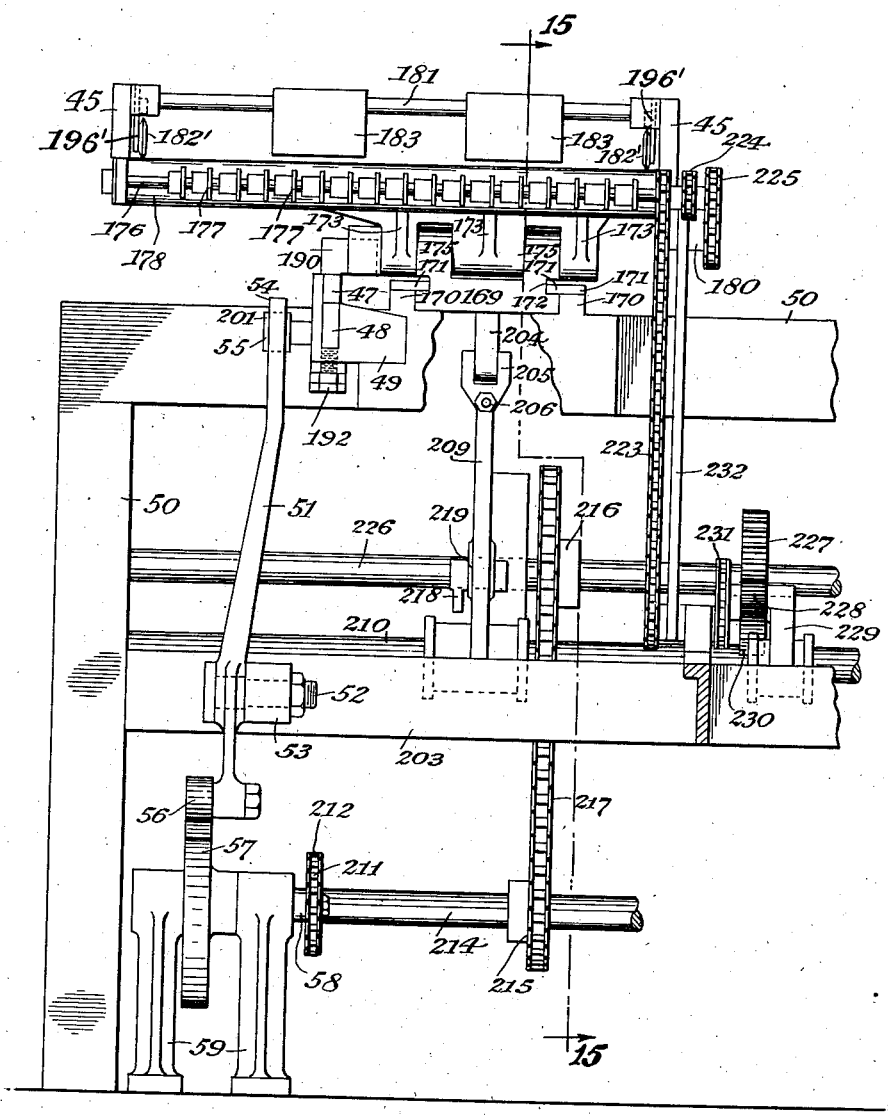
Fig. 14 is an elevation looking toward the front of the machine and taken on the line 14—14 of Fig. 1 showing the mechanism for giving a compound horizontal and arcuate motion to the feed table in front of the mandrel.

A parent roll of chip board 20 is mounted on suitable brackets and the sheet A is fed over the roll 21 and the roll 22 and under rolls 23 and 24 which engage the web A with glue roll 25 which turns on glue roll 26 rotatable in adhesive C in the main glue pot 27, at which station the upper or outer surface of chip A is continuously coated with adhesive. A roll 28 carries the sheet of chip A to a roll 39 and around a dance roll 40 which is mounted on a lever 41 which at the other pivoted end mounts by a pin and slot connection an arm 42 which operates a drive clutch for rolls 25 and 26. A second glue pot 30 contains adhesive C. Roll 31 engages the adhesive and a roll 32 mounted thereover but slightly below the normal path of chip A. Rolls 33 and 34 are symmetrically positioned over the roll 32 on arms 35 and 36 which are operated by a roller 37 which engages a cam 38 which intermittently raises and lowers the rolls 33 and 34 to engage the top of chip A and to apply adhesive intermittently to the lower side or inside of chip A. The web A is next led up to a feed table 43 which mounts a gravity lever 44 which holds the web A against back slipping and is pivotally mounted at each side of the table. The table 43 is moved to and fro in a horizontal plane. Roller 47 is mounted on the table 43 and rides on the top surface of a sliding cam 48 mounted on a shelf 49 projecting from a stand 50. An operating lever 51 (Fig. 2) having a pivotal mounting 52 on a bracket 53, which is mounted on the stand 50, has at the end of the upper arm a slot 54 which engages a block 201 (see Fig. 15) slidable therein and in which is pivotally mounted a pin 55 mounted on the sliding cam 48, and at the end of the lower arm a roller 56 which engages a cam 57 mounted on a shaft 58 which turns in a bracket 59 mounted on the stand 50. The upper surface of sliding cam 48 has an inclined outline so formed that the rotation of the eccentric cam 57 imparts a vertical arcuate motion to the table 43, which is compounded with the horizontal motion of the table to move its left end for purposes and in a way hereinafter set forth.

During the cycle above set forth a web B has been feeding from the opposite end of the machine to meet and be combined with the web A. A parent roll 62 of inner-liner material B is mounted on a supporting stand 63. The web B is threaded under a roll 64 and over a roll 65 above which slitter knives 66 may be mounted to slit the web B longitudinally. Web B is next threaded between feed rolls 67 and 68 and over roll 69 over which is mounted a rotary cutter 70 which makes a series of transverse cuts, but leaving enough of web B uncut to maintain lengthwise continuity. The length of the inner-liner is varied by changing the ratio between sprockets at 69 and at 76. A vacuum belt 71 is operated by a roll 72 and a roll 73 the latter contacting the upper surface of the belt 71 in such a manner as to insure web tension uniformly under the cutter 70. The belt 71 carries the sheet edge B to its extreme right end where the left end of the table 43 swings down to meet it, carrying the leading edge of chip A with glue on both sides.

A table 75 (Fig. 2) supports suitable mountings for the rolls. A power shaft 76 is rotatably mounted on a bracket 77 projecting from the stand 50, and suitable belting drives the rolls 69 and 72. Brackets 78 on either side of the belt 71 loosely mount a tear roll 79.

The opposite ends of the strips A and B are overlapped with the inner-liner B atop and a glue finger 81, pivotally mounted on pins 82 at the side of the table 43, has a projection 83 at the opposite end. A spring 84, secured both to the finger and the table yieldably holds the finger 81 upright. A vertical pin 85 mounted on a plate 86 is adjustable to left and right by set nut 87 on top of stand 50, to exactly engage the projection 83 and to force the glue pot 88 down on the overlapped edges of A and B, against the tension of spring 84, from the position shown in Fig. 2 to that shown in Fig. 1. Perforations 89 in the bottom of pot 88 apply adhesive to the top edge of the web B. Thereupon the table 43 moves forward and upward simultaneously, and web B is severed along the transverse perforations formed by the rotary cutter 70 by being thus brought into engagement with the tear roll 79, and the overlapped edge of A is presented to the gripper 91 which may be any well-known structure, on the mandrel 92, which may be any shape in cross-section but as shown is square. The gripper 91 closes and rolls 93 are moved down tight upon the mandrel 92 to make the laminations better adhere.

After the mandrel 92 has made the required number of turns it stops and the table 43, having meanwhile moved back, swings upward to bring the web A in contact with a transverse knife 101 which shears the web transversely. This is effected by the roller 47 momentarily riding upon the top surface of the slide cam 48, which imparts a slight upward tilt to the table 43, thus bringing the edge thereof into engagement with the knife 101. After the severing of the web A, a stripper 131 moves forwardly along the mandrel 92 which transfers the container body just formed to the labeling position. It will be appreciated that the transverse severing of the web A forms a flap extending from the adjacent vertical face of the mandrel to the knife 101 and in that respect the container body is incompletely wound. As the container body is moved along the mandrel 92 this flap projects outwardly and is rolled down at the label station.

Referring to Figs. 4 and 6 an end plate 103 is mounted on the front edge of the table 43 and is provided with studs 104 engageable with the mandrel 92 to retract the plate 103 against coil springs 105, mounted on the table 43 in recesses and held in position by a plate 106 secured to the table 43 by screws 107. Screws 108 and slots 109 guide the end plate 103 in a linear path.

Referring to Figs. 7 and 8 a suitable mounting is provided for the inner-liner paper roll 62 on the stand 63. A shaft 110 has a flat side 111 and is rotatably mounted, by a screw 112, with a collar 114 which has a flat side plate 115 for engaging the side of the roll. Inside the plate 115 is a core extension 116 surrounding the shaft 110 and having a beveled end 117 about which are a plurality of lengthwise radial slots 118 symmetrically disposed, the bevel end 117 being cutaway at 119 on either side of the slots 118 for the insertion of pivot pins 120 on which are mounted small wheels 121 which snugly and rotatably fit the slots 118. The periphery of each wheel 121 may be transversely concave. A reduced extension shaft 122 is rotatable on the open bearing 123 and carries a flanged collar 124 engageable by a yoke 125 mounted on the bearing and operated by an adjustable screw 137 for aligning the web roll 62 transversely. The core of the roll 62 is securely held against turning by the edged wheels 121 on the core extension 116 but it is easily inserted in position or removed.

Referring to Figs. 9, 12, and 13 an ejector 131 closely surrounds the mandrel 92 and pivotally connected thereto is an ejector arm 132 which in turn is pivotally connected with an arm 133 which is pivotally connected at the bottom with a link 134 the opposite end of which is pivotally mounted on a post 135 secured on the stand 50. A roll 137 on arm 136 lies in a cam groove 138 in a cam 139. A link 140 is pivoted on the upper end of bar 136 and its opposite end yieldably engages a pin 141 mounted on the arm 133, and has a right-angled extension 142 which normally overlies the arm 133. A pin 143 is yieldable vertically in the extension 142 against a coil spring 144 which is held at the top by a washer 145 locked by a screw 146 and lock nut 147. If too great resistance is offered to the ejector 131 the pin 141 breaks away from link 140 and ejector jamming of tubes on the mandrel 92. After the arm 132 becomes inoperative which prevents tubes 148 (Figs. 18, 19 and 20) are formed ejector 131 moves them over to the labeling station shown in Figs. 9 and 10. A stack of labels 149 is mounted on a table 150 mounted for vertical reciprocation on a leg 151 supporting at the lower end a roll 152 and which is raised and lowered by a cam 153 to bring the right end of the top label 149 into engagement with the adhesive-covered tube 148, and the left end of the label 149 in contact with a glue bar 154 which places glue on the outside outer edge of the label to assure that the overlap of the label be glued, and also mounts on arms 155 and 156 pivotally, a stripper 157 which strips the label from the bar 154 as soon as the label table 150 starts to return. The glue bar 154 is carried back after each operation to contact a roll 158 mounted in a glue pot 159. The arm 154 is mounted on an arm 160 which is moved to and fro horizontally.

Referring to Fig. 11, a bracket 161 secured on the upright 162 mounts three rollers 163 spaced equidistantly about the axis of the mandrel 92. A flange ring 164 has a peripheral counter-sunk track 165 which engages the rollers 163, and is rotatable with the mandrel 92. Four equidistant brackets 166 are mounted circumferentially on the ring 164 and each supports inside the ring a roller 167 which may bulge at the center. As tubes 148 are forced off the mandrel 92 by succeeding tubes, the tubes pass thru the rollers which true the sides of the tubes before they are ejected.

The feed table 43 is pivotally mounted on a base plate 169 (see Figs. 14 and 15) slidably mounted on the flat top of the stand 50 between parallel uprights 170 which mount plates 171 which project into lengthwise grooves 172 formed in the sides of the base plate 169. Feed table 43 is pivotally mounted by means of lugs 173 on a shaft 174 which is horizontally mounted in uprights 175 on the base plate 169 on top of the stand 50. The table 43 supports at the rear a shaft 176 on which is mounted a plurality of feed rolls 177 over which the sheet A is fed to the table over rolls 178, 179, and 180, intermittently driven. The uprights 45 on each side of the table support between them a rod 181 rotatably mounted and carrying slitter knives 182' mounted upon arms 196', the latter being adjustable longitudinally of the rod 181. The slitter knives 182' are for trimming the marginal edges of the chip stock A, and are held in contact therewith by weights 183 mounted on the rod 181. A gravity brake 44 is pivoted on the table 43 to prevent back slipping of the web A.

The levers 81 are secured on the table 43 on horizontal pivot pins 82 and have lower arms 83. Coil springs 84 (see Fig. 2), secured to the levers 81, and to the table 43 normally hold the levers 81 in the upright position. The levers 81 between them mount a gravity glue pot 88 (see Fig. 4), in the bottom of which are perforations 89 so that when levers 81 are in the lower position, glue is applied to the leading edge of the top surface of the sheet of inner-liner paper on the table. As previously described, on the flat table 50 are mounted posts 85 adjustable back and forth with respect to arm 83 by means of stud bolts 87 slidably engaging slots in the arms 86. When the front end of the table 43 tilts down the ends 83 of the levers 81 engage the posts 85 and cause glue pot 88 to contact a sheet of paper on top of the table. Slots 80 may be provided on both sides of table 43 to thread the trim, made by the slitter knives 182' carried on the rod 181, through at the edges of web A when required to deflect them to the floor under the machine.

An arm 190, secured to the shaft 174, projects forwardly from the bracket 173 and supports at its end a roller 47 (see Fig. 2) on a transverse pivot. A slide cam 48 is mounted to reciprocate horizontally in the table 50 from front to rear, and is adjustable vertically by means of the screws 192 (see Fig. 14). A pin 55 is mounted in the slide cam 48 and in a block 201, which slides in the fork 54 at the upper end of the actuating lever 51. The top of the slide cam 48 has a flat surface at the left end and an inclined and lower surface at the right side so that when the arm 51 is moved to the left from the position shown in Fig. 15, the roller 47 drops down and permits the right end of the table to tilt downwards until the arm 83 engages the post 85.

The lever 51 is mounted on a pin 52 in a bracket 53 which is mounted on a cross-piece 203 in the table 50. The lower end of the lever 51 mounts a roller 56 which engages the periphery of a specially formed cam 57 which is rotatably mounted on a shaft 58 which has bearings in uprights 59.

A lug 204 (see Figs. 14 and 15) projects downwardly from the base plate 169 and is pivoted to opposite arms of a yoke 205 in which is horizontally disposed a threaded rod 206 which is adjustable to the front and rear by means of nuts 207. The opposite end of the rod 206 is pivoted at 208 to a crank pivotally mounted at the lower end on the shaft 210. A sprocket 211 fixed on the shaft 58 is connected with a second sprocket 212 by a chain 213. The sprocket 212 is mounted on a shaft 214 which mounts a second sprocket 215 which is connected by a chain 217 with the sprocket 216 mounted on the drive shaft 226. An arm 218 has a pin and slot connection 219 with the crank 209 and at the other end of the arm 218, is secured an arm 209' by means of a pin 219'. The arm 209' has its lower end pivoted to a bracket 220 suitably mounted on the machine frame, and the upper end of the arm 209' carries a roll 56' adapted to engage a cam track 57' formed in the sprocket 216. By this arrangement the roll 56' moving in the cam track 57' oscillates the arm 209', which, through the arm 218, effects the oscillation of the arm 209, thereby producing a to and fro motion in a horizontal plane of the table 43, and this motion when combined with the arcuate motion produced by the above described train of mechanism, including the lever 51 and its associated parts, produces a compound horizontal and vertical motion placing the free end of the table in a plurality of positions for a predetermined time.

These positions vary from having the edge of the table 43 tilted downwardly in a receptive position for the leading edge of the inner-liner B to be fed over the chip A, as shown in Fig. 1, from whence it moves vertically and horizontally to a position where the end plate 103 mounted on the edge of the table 43, is retracted by the studs 104 engaging the mandrel 92, at which time the folded edge of the webs A and B is inserted in the gripper of the mandrel. From that forward position the table 43 moves backward or away from the mandrel 92, in a horizontal position (see Fig. 2) and, as previously explained, in its extreme right position, the roller 47 is brought into engagement with the top or upper flat surface of the slide cam 48, which raises the edge of the table slightly so as to bring it into contact with the shear knife 101, thus shearing the web A transversely. From that position the edge of the table 43 is lowered, by a forward horizontal movement, combined with a downward movement in an arcuate path, which movements are produced by the cam arrangements including the cams 48 and 57 operating in compound relationship. When the edge of the table 43 reaches its extreme lowered, forward position, the cycle of operations just described is repeated with the winding of each container body.

A primary chain drive 223 and supplemental chain drives 224 and 225 may rotate the rolls 177, 178, and 179, on the table 43. A gear 227 on the shaft 226 is intermittently engaged by a pinion 228 on arm 229 which is fastened to the shaft 210 and synchronized with arm 209 so that thru pinion and chain 231 rotary motion is given the rolls 177, 178, and matrix roll 179 thru the chain 223 and matrix roll 180 thru a belt, intermittently and in relationship to the horizontal motion of the table 43. Slots 80 (see Fig. 2) are provided at the side of the table 43 to thread the trim of the web A, made by the slitter knives 182 carried on the rod 181, thru to the floor. The longitudinal slitting of chip A is done on the driven matrix rolls 179 and 180. Slitter knives 182 are mounted adjustably on arms 196 mounted on cross-shafts 197 which unite side pieces 198 mounted on the shaft 181 between the uprights 45. The slitter knives 182 may be adjusted longitudinally of the cross-shafts 197 by any suitable means such as having threaded collars or the like, and two cross-shafts are preferable to a single cross shaft in order to secure more latitude in spacing the knives with respect to each other; that is to say if the knives 182 are all mounted on a single cross-shaft 197 they could not be adjusted any closer together than the widths of their mountings, whereas by having a pair of cross-shafts 197, the knives 182 may be brought as close together as desired.

Referring to Fig. 16, a frame 74 mounts on a left extension, a roll 20 of chip paper A or body stock for the tubes. As previously described, the chip paper A is fed under rolls 21, 61, and 22, and under rolls 23 and 24 whose axes are below the top of a glue roll 25. The glue roll 25 lies over and engages a roll 26 which is mounted to turn in a glue pot 27. After leaving the roll 24, the chip A is completely covered on one side with adhesive and is led over the roll 28. The web A is next led over the roll 39 and down over a dance roll 40 which is mounted on a lever arm 41 pivoted on the frame 74. Near the pivoted end by means of a pin and slot connection, a link 96 connects at the opposite end with one end of lever 42, pivotally mounted on the base frame 74 and to the other end of the lever 42 is connected a link 97 which operates a clutch 94 which gives intermittent action to the power roll 95 to intermittently apply adhesive to the opposite side of the chip sheet A. The chip A is fed over a roll 60 and under rolls 33 and 34 which are mounted on arms 35 pivoted at 46 so that they may rise and fall over a glue roll 32 which is rotatably mounted in a glue pot 30. Supplemental roll 31 engages the glue roll 32. The chip paper A is then led out to the feed table 43 as shown in Fig. 1. A roller 37 (see right end of Fig. 16) is mounted on a lever 183 which supports a sprocket which connects by means of a chain with the power roll 95. The lever 183 moves to the left and right as the roller 37 engages the periphery of a cam 38. By means of a crank 193 the lever 183 operates a connecting rod 184 which through the crank 186 oscillates the shaft 185 which actuates rotatably the shafts 187 and 188, by means of cranks 194 and 195 the shaft 189 being lifted by the rotation of the shaft 187 thru arm 190, raises and lowers the arms 35 to disengage and engage the rolls 33 and 34 from and with the glue roll 32 intermittently under the control of the cam 38.

Referring to Figs. 17, 18, 19, 20, and 21 the tubes 148, two in number, have been pushed along from the labeling station in front of the glue bar 154 and the glue pot 159, to the end of the mandrel under the truing rolls 167.

In Fig. 18 is illustrated the form of a tube before it enters the truing rolls, when the tube is formed of such body stock as manila or asphalt lined. The application of the rolls which have convex equators sets the plies of the container tube into the form shown in Fig. 19 and offsets the convexity shown in Fig. 18 so that when the tube is ejected from the end of the mandrel, it takes the exact square form shown in Fig. 20. This roll mechanism for truing the tube is not necessary when a soft body stock such as chip board is used.

Referring to Fig. 17, parallel transverse bars 233 and 234 mount a plate 235 which may be adjustable transversely thereon. A block 162 has pivotally mounted thereon an arm 236 on a pivot pin 237. The arm 236 supports horizontally a pin 238, the left end of which engages in an axial socket 239 in the mandrel 92 to provide a pivot support for the right end of the mandrel. A pin 240 may be connected to the arm 236 and extends downwardly to the right therefrom for removing the pin 238 from the socket 239. The rod 240 has a resilient connection with the end of a crank 242 by means of a spring 241 and the crank 242 is pivoted at 243 on the bracket 235 and is rigidly connected with a lever 244, the lower end of which engages a peripheral groove in the convolute cam 245 which is fixed on the shaft 246, the shaft 246 being mounted in bearings 247; and 248. It is obvious that by rotating the convolute cam 245, the arm 242 is moved up and down intermittently to fix the pin 238 into position, and to completely tilt it down and away from the mandrel 92. The operation is automatic and is suitably synchronized with other mechanism of the machine.

Directing attention particularly to Figs. 22 and 26, it will be seen an arm 249 pinned to the rock shaft 250 supports the roll 93 over the mandrel in such a way as to press down on the mandrel when the body stock is being rolled thereon to form a tube. An arm 251 is also fastened on the rock shaft 250 and engages a coil spring 252 and has a slot through which passes a vertical post 253 which is mounted on the standard 277. Nuts 254 secure the coil spring 252 over the arm 251 and are movable to adjust the tension of the coil spring 252 so that pressure is applied by the roll 93 on a tube being formed on the mandrel 92 to secure the plies together evenly. The roll 93 is particularly useful when a non-circular mandrel is used to form a non-circular tube and the use of the coil spring 252 as described, prevents the roll 93 from jumping away from the mandrel 92 or bumping on the tube during the rotation of the mandrel. Another arm 255 (see Fig. 24) extends forwardly from the rock shaft 250 and is engaged on the upper surface by a stop screw 256 and at the bottom by a vertically reciprocating stud 257. A slide cam 258 is mounted to slide in the direction of the mandrel and has an inclined surface 259 which engages the bottom of the stud 257. Screws 260 and 261 are secured in the slide cam 258 and are slidingly engaged by slots 262 and 263 in an arm 264 which extends forwardly and obliquely and which supports at its outer end a stud 265 which projects downwardly from the arm 264 and lies in a groove in and is actuated by a rotatable cam 266 mounted on a collar and suitably synchronized with the mechanism of the machine.

Referring now to Figs. 23, 24 and 26, the rod 132 has a pivotal connection 267 with a slide 268 which carries a yoke 269 and which is mounted in transverse arms 270 and 271 which provide top and bottom tracks for the slide 268. A bracket 272 is secured by screws 273 to the arm 270 and supports the rock shaft 250 in suitable bearings formed therein. The arms 270 and 271 are connected by a plate 274 which is positioned vertically and is fastened by bolts 275 through a shim 276 to a standard 277 on the stand 50. A shaft 278 is rotatably mounted in the standard 277 and is operatively connected with the mandrel 92. A bracket 279 secured by bolts 280 on the plate 281 and the plate 274 confine the stud 257 by means of bolts 282. The plate 281 also supports the slide 258. A bracket 283 on the arm 270 rotatably supports the mandrel 92. A rod 284 is rotatable to operate the gripper 91 and may be actuated in any way known in the art by a crank attached to the opposite end.

It is obvious that when the oblique arm 264 is moved by the rotatable cam 266, which may be suitably connected with the driving mechanism of the machine to procure synchronous action with the stripper, that the rolls are lifted away from the mandrel to permit the tubes to slide along the mandrel without any friction from the rolls. By the foregoing mechanism automatic action is procured in the machine.

Referring to Figs. 26 and 26—A, the gripper jaw 91 (shown in Fig. 22) is rotated by a rod 284 which is oscillatory in a central bearing in the driving spindle 286. The rod 284 has a crank connection 284' accommodated in a recess in the head of the spindle 286. A sleeve 287 is slidably mounted on the spindle 286 and is reciprocated thereon by the engagement of an upstanding yoke forming part of a slide member 292', and fitted in an annular groove in the head of the sleeve 287. The rod 284 has a laterally extending pin 285 which projects in a diagonally arranged slot in the sleeve 287. A collar 387' is fitted on the sleeve 287, and a coil spring 288 surrounding the spindle 286 has one of its ends pressed against the collar 287', and the other end against a brake drum 294 keyed to the spindle 286, the friction element of the drum 294 being adapted to engage the periphery of the drum 294. The slide member 292' is actuated in a slide 292 by means of a cam 289, mounted on a shaft 290 which is parallel with the mandrel 92, said cam 289 having a peripheral groove in engagement with a roller 291 and oscillated thereby. The roller 291 oscillating in the groove of cam 289 moves the slide member 292' to the left, thus causing the pin 285 to ride upwardly in the slot of the sleeve 287 and oscillate the shaft 284, which, thru the link 284', partially rotates the gripper jaw 91 so as to open the same. As the roller 291 continues to move in its cam track the slide member 292' is moved thereby back to normal position which permits the expansion of the spring 288 and the retraction of the pin 285, thus effecting the closure of the gripper jaw 91. During this cycle of opening and closing the gripper jaw 91, a partially wound tube has been released and moved lengthwise along the mandrel 92 and the folded edge of the advancing composite body stock inserted into the gripper jaw 91.

The labeling station is shown at the right in Fig. 26 and in Fig. 27, following the schematic showing in Fig. 10 and general description thereof, comprises a vertically movable table 150 supported on a slide 151, a glue bar 154 over the table for applying adhesive to the rear edge of a label 149, and a glue pot 159 for wetting the bar 154. The table 150 has at the front an upright plate 300 against which the stack of labels 149 are set, back side up. A bracket 301 is slidably mounted at the left end in a support 302 mounted horizontally on the side of the stand 50 and has parallel grooves or tracks at the top and bottom in which the bracket 301 is adjustable to the front and rear and its exact rear position determined by a set screw 303 having a mounting 304 on the support 302. The slide 151 is mounted in a vertical standard 305. Springs 306 are fastened on hooks 307, which project at each side of the top of the standard 305, and on eyelet pins 308 adjustably mounted on angle arms 309, one on each side of the slide 151 at the bottom. The springs 306 tend to lift the table 150 towards the mandrel 92. The standard 305 is mounted on a plate 311 which is mounted to slide toward and away from the stand 50 to adjust the table along the mandrel 92 under the control of a screw 312 mounted at 313 on the bracket 301. A roller 314 (see Fig. 27) is attached to the slide 151 and extends horizontally therefrom toward the stand 50 and engages a flat portion 315 on a lever 316. The lever 316 has a roll 317 on the front end which engages the periphery of a cam 318 mounted on the end of the shaft 290. The cam 318 has a notch 319 into which the roll 317 falls because of the upward tension of springs 306 and this movement permits a lifting action of the label table 150 which brings the right or front edge of a label into contact with a tube 148 on the mandrel 92. The left end of the lever 316 has a pivotal mounting 320 in a bracket 321 which has a pivotal connection with an arm 322 mounted on the bracket 301. An arm 323 is pivoted at 324 on an upright 325 mounted on the slide 151 and supports a pawl 326 engaged by a spring 327 which holds the pawl 326 in engagement with a vertical row of teeth 350 formed on the right edge of slide 151 and the table. Legs 328 are adjustable in a groove 329 on a base plate 330 supported atop the slide 151.

The glue pot 159 is mounted on a bracket 331 to which it is secured by a screw 332. The bracket 331 is slidable horizontally on a pair of bolts 333 extending thru a slot 334 in a support 335 which has a right angled bracket 336 having a vertical slot 337 which is engaged by a bolt 338 mounted in a slide 339 that is mounted in a vertical track plate 340 on the stand 50. A set screw 341 in an arm 342 adjusts the height of slide 339. A left extension 343 of the slide 339 supports a depending shaft 344 which is engaged by a cam 345 fixed on the shaft 346 which may be synchronized by suitable connections with the shaft 290. When the cam projection 347 engages the shaft 344 the glue roll 158 is lifted up to engage the bar 154 when it is moved to the left position shown in Fig. 10. A pawl 351 has a vertical pin-and-slot adjustment 352 on the outer end of bar 154 by means of arm 353 on which it is pivoted at 354. When the bar 154 is moved back to the left pawl 351 engages the ratchet wheel 355 and turns the roll 158 in the adhesive to supply the engaging surface of the roll with fresh glue.

Figure 28:
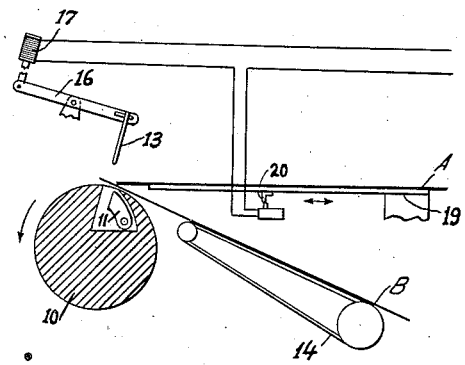
Fig. 28 is a schematic view of a modified structure for folding an end of an inner-liner strip over the end of the body stock and inserting the combined edge into a mandrel.
Figure 29:
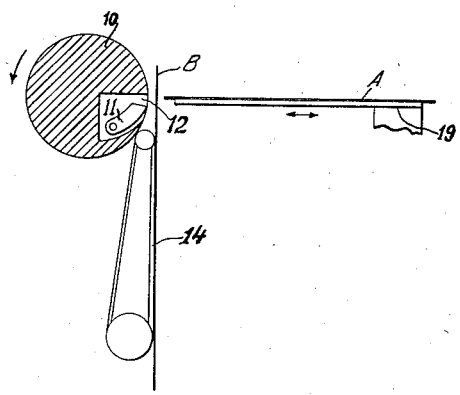
Fig. 29 is a view similar to Fig. 28 but of another modification.
Figure 30:
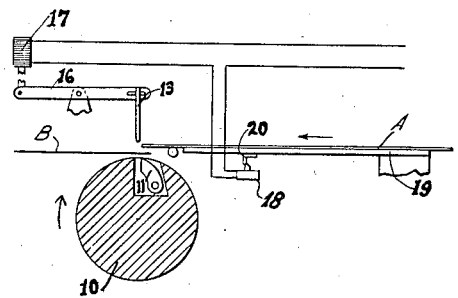
Fig. 30 is a view similar to Fig. 29 but of still another modification.

Referring to Figs. 28, 29, and 30 there are shown different combinations of mechanism for introducing an inner-liner and a sheet of chip into a mandrel prior to rolling the mandrel to form the tube of combined sheets.

In Fig. 28 the mandrel 10 is shown with the gripper jaw 11 in the open position which forms a cavity 12 opening to the outer surface of the mandrel 10 which allows a tucker bar 13 to enter the cavity. A web of chip board A is fed in a horizontal plane on the top surface of a flat table 19 to a position adjacent the cavity 12 in the mandrel 10 and likewise a web of inner-liner material B is fed on a vacuum belt 14 mounted under the table 19 and inclined in a plane that intercepts the periphery of the mandrel 10 adjacent the cavity 12. The leading edge of the inner-liner sheet B crosses the cavity 12 and underlies the leading edge of the chip board A which overlies the inner-liner sheet B and the cavity 12. When the edges of the sheets A and B are in this position, the tucker bar 13 is moved down and pushes both webs A and B into the cavity 12 and then retracts as the gripper 11 grips the leading edges and the mandrel 10 rotates from right to left, or counter-clockwise. It is noted that the leading edge of the web B contacts both sides as well as the front edge of web A so that when the gripper jaw 11 closes, the web A is held between a fold of the web B. The tucker bar 13 is actuated by a lever 16 and a solenoid 17 actuates the opposite end of the lever to move the tucker bar 13 into the cavity 12. On the bottom of the table 19 is fastened a fixed angle clip 20 (see Fig. 30) which engages a micro-switch 18 and closes an electrical circuit through solenoid 17 thereby causing the tucker bar 13 to enter the cavity 12 in the mandrel 10 when the leading edges of the sheets A and B are in the position shown in Fig. 28.

Referring to Fig. 29 the chip board A feeds across a flat table 19 in a horizontal plane passing through the axis of the mandrel 10. A vacuum belt 14 is mounted so that its operative surface is in a perpendicular plane tangential to the mandrel 10. This construction is another modification of the above described apparatus of making a fold of the web B by utilizing the leading edge of the chip board A as a tucker bar for inserting the leading edge of the inner-liner sheet B into the cavity 12 in the mandrel 10 after which the mandrel may be rotated to wind the combined sheets in the form of a tube by turning the mandrel 10 from right to left by suitable mechanism.

Referring to Fig. 30 the leading edges of the webs A and B are delivered in the same plane tangential to the mandrel 10 but from opposite directions to overlap with the leading edge of the inner-liner sheet under the leading sheet edge of the chip board A. When the edges of the sheets are in an overlapping position, a tucker bar 13 is actuated as in the case illustrated in Fig. 28 by means of the actuation of micro-switch 18 by the angle clip 20 mounted on the lower surface of the table 19 closing an electrical circuit through a solenoid 17 which is secured to the outer end of a lever 16 on the front end of which is a connection with the tucker bar 13. The mandrel is rotated from left to right or clockwise.

It will be understood that all the constructions illustrated in Figs. 28, 29, and 30 can be combined with any suitable means for applying adhesive to the sheets A and B where desired.

It will be understood that the table 19 may have a horizontal motion similar to that of the table 43 illustrated in a preferred form of the invention, and that the other mechanism illustrated in the preferred form of the invention can be utilized in whole or in part in combination with any of the modifications illustrated in Figs. 28, 29, and 30.

Having shown and described certain embodiments of our invention and realizing that, in view of our disclosure, many changes, substitutions, or omissions of parts will readily occur to those skilled in the art, but within the spirit and scope of our invention, we do not limit ourselves except as in the appended claims.

We claim:
1. The combination with a machine for making laminated tubes comprising a mandrel and a gripper therein, of means for feeding a strip of paper to the gripper, means for simultaneously feeding a second sheet of paper to the gripper, and means for folding the edge of one sheet over the other and securing them together and inserting the folded edge into the gripper.

2. The combination with a machine for making laminated tubes having an inner-liner of oil or water impervious material comprising a mandrel and a gripper therein of mechanism for applying adhesive to one side of the strip of paper which is rolled into the tube and means for applying adhesive to the opposite side of the strip that forms the inside of the tube and for a distance equal to the length of the inner-liner.

3. The combination with a machine for making laminated tubes having an inner-liner of water or oil impervious material of mechanism for feeding a strip of paper to form the laminations of thhe tube to a point adjacent a gripper, means for simultaneously feeding a strip of inner-liner material to the same point adjacent the gripper, and means for folding the end of the inner-liner over the edge of the lamination strip.

4. The combination with a machine for making laminated tubes having an inner-liner of water or oil impervious material of mechanism for feeding a strip of paper to form the laminations of the tube to a point adjacent a gripper, means for simultaneously feeding a strip of inner-liner material to the same point adjacent the gripper, and means for pushing the ends of the two strips into the gripper.

5. The combination with a machine for making laminated tubes comprising a mandrel and a gripper therein, of mechanism for feeding a sheet coated with adhesive towards the mandrel, means for securing the end of an inner-liner sheet to the end of the coated sheet, means for applying adhesive to the exposed end of the inner-liner sheet, and folding the end of the inner-liner sheet over the edge of the coated sheet and delivering the folded edge to the mandrel, and means for finally cutting the coated sheet.

6. In a machine for making laminated tubes having a rotatable mandrel, the mandrel having a lengthwise gripper jaw, means for feeding a strip of paper toward said jaw, means for feeding a separate strip of paper to said jaw in a plane at an angle to the first strip of paper, and means for folding one strip over the other and pushing the combined edge into said jaw.

7. In a machine for making laminated paper tubes having a mandrel rotatably mounted therein, said mandrel having a lengthwise gripper jaw, means for applying adhesive to one side of a strip of paper as it is fed toward said jaw, means for applying adhesive to the opposite side of said strip of paper intermittently, means for feeding the edge of a second strip of paper over the edge of the first strip, and means for simultaneously pressing said edges together and applying adhesive to the exposed side of the edge of the second strip.

8. In a machine for making laminated tubes having a rotatable mandrel and a gripper jaw in said mandrel, means for feeding a strip of paper toward said mandrel, means for feeding a second strip of paper in a direction opposed to the feed of the first strip of paper, a table supporting said first strip of paper near the mandrel and movable toward and away from the mandrel and means for causing the table to tilt out of its normal plane for receiving on the edge thereof a second strip of paper.

9. In a machine for making laminated tubes having a rotatable mandrel and a gripper jaw in said mandrel, means for feeding a strip of paper toward said mandrel, means for feeding a second strip of paper in a direction opposed to the feed of the first strip of paper, a table supporting said first strip of paper near the mandrel and movable toward and away from the mandrel and means for causing the table to tilt out of its normal plane for receiving on the edge thereof a second strip of paper, said means comprising supporting rollers and an inclined cam, said table being movable in a compound motion.

10. In a machine for making laminated paper tubes having a rotatable mandrel and a gripper jaw in said mandrel, a table horizontally mounted for moving toward and away from said mandrel, means for feeding a strip of paper over said table, means for feeding a second strip of paper to a position outside the plane of said table, means for tilting said table to a position adjacent the free edge of said second strip, means for securing the edge of said second strip on top of said first strip and means for moving the combined strips to the gripper jaw and for inserting them therein with the edge of the second strip folded over the edge of the first strip.

11. In a machine for manufacturing paper tubes having a rotatable mandrel and a gripper jaw in said mandrel, said mandrel having a transverse non-circular periphery and means rotatable with the mandrel for truing the walls of a tube to the form of the mandrel.

12. In a machine for manufacturing paper tubes having a rotatable mandrel and a gripper jaw in said mandrel, said mandrel having a transverse non-circular periphery and means rotatable with the mandrel for truing the walls of a tube to the form of the mandrel, said means comprising a plurality of rollers mounted transversely to the axis of the mandrel.

13. In a machine for making laminated tubes having a rotatable mandrel and a gripper jaw mounted in said mandrel, a table for feeding a strip of paper to said gripper jaw, said table being mounted near said mandrel and movable toward and away from said mandrel in a horizontal plane and also through an arcuate path in a vertical direction, the horizontal and arcuate movements being effected by two prime movers operating in compound relationship, and a knife positioned adjacent said table and said gripper jaw for severing the strip of paper at a predetermined position of the table.

14. The combination with a machine for making laminated tubes comprising a mandrel and a gripper therein, of means for feeding a strip of paper to the gripper, means for simultaneously feeding a second sheet of paper to the gripper, and means for folding the edge of one sheet over the other, compressing them together, and inserting the compressed edge into the gripper.

15. The combination with a machine for making laminated tubes comprising a mandrel and a gripper therein, of means for feeding a strip of paper to the gripper, means for simultaneously feeding a second sheet of paper to the gripper, and a tucker bar movable toward and away from the mandrel for pushing the edges of both sheets into the gripper.

16. The combination with a machine for making laminated tubes comprising a mandrel and a gripper therein, of means for feeding a strip of paper to the gripper, means for simultaneously feeding a second sheet of paper to the gripper in a direction different from the direction of the feed of the first sheet, and a tucker bar movable toward and away from the mandrel for pushing the leading edges of both sheets into the gripper.

17. The combination with a machine for making laminated tubes comprising a mandrel and a gripper therein, of means for feeding a strip of paper to the gripper, means for simultaneously feeding a second sheet of paper to the gripper across and in front of the leading edge of the first sheet, and at an angle thereto, and means for pushing the leading edge of the first sheet into the gripper and simultaneously folding the leading edge of the second sheet over the leading edge of the first sheet so that the leading edge of the first sheet lies between the second sheet in the gripper.

18. The combination with a machine for making laminated tubes comprising a mandrel and a gripper therein, of means for feeding a strip of paper to the gripper, means for simultaneously feeding a second sheet of paper to the gripper in a different direction from the direction of the feed of the first sheet, a movable table over which the first sheet moves to the gripper, a tucker bar pivoted to move toward and away from the mandrel for pushing the leading edges of both sheets into the gripper, and an electric circuit including a micro-switch operated by the table and a solenoid operatively connected with the lever that operates the tucker bar.

19. The combination with a machine for making laminated tubes comprising a mandrel and a gripper therein, means for feeding two webs in different but converging directions, means for severing the webs into sections of different lengths, means for adhesively joining a section of shorter length to a section of longer length, and means for winding the two web sections simultaneously in superimposed relation, with the shorter web forming the inside wall of the tube.

20. In a machine for making laminated tubes, a mandrel having a gripper, means for simultaneously feeding two sheets of paper in different but converging directions, and means for folding the edge of one sheet over the other and continuing the advancement of the unfolded sheet to insert the folded edge into said gripper.

21. In a machine for making laminated tubes, a mandrel having a gripper, means for feeding a sheet of paper in one direction, means for feeding a second sheet of paper in the opposite direction, means for continuously applying adhesive to one side of the body sheet, means for intermittently applying adhesive to the other side of the body sheet, means for folding the edge of one sheet over the leading edge of the other and adhesively securing them together, and means for thereafter feeding the leading edge of the composite body sheet in the direction of the gripper and inserting the folded edge therein.

22. The combination with a machine for making laminated inner-liner fibrous tubes comprising a mandrel having a gripper, means for feeding a fibrous body sheet and an oil proof parchment in opposite directions, means for continuously applying adhesive to one side of the body sheet, means for intermittently applying adhesive to the other side of the body sheet, means for adhesively uniting a measured length of the parchment in dry condition to the body sheet, means for directly advancing the leading edge of the composite body sheet to the gripper, and means for rolling the composite body sheet to form a tube.

HARRY W. MORGAN.
RICHARD E. B. WAKEFIELD.